United States Patent
Bertelsen et al.

(10) Patent No.: US 7,510,143 B1
(45) Date of Patent: Mar. 31, 2009

(54) WING ASSEMBLY AND AIRCRAFT

(76) Inventors: William D. Bertelsen, 546 Pensacola Dr., Bay City, MI (US) 48708; William R. Bertelsen, 2720 31st Ave., Rock Island, IL (US) 61201

( * ) Notice: Subject to any disclaimer, the term of this patent is extended or adjusted under 35 U.S.C. 154(b) by 620 days.

(21) Appl. No.: 11/368,230

(22) Filed: Mar. 3, 2006

Related U.S. Application Data

(60) Provisional application No. 60/658,241, filed on Mar. 3, 2005.

(51) Int. Cl.
B64C 3/40 (2006.01)
(52) U.S. Cl. .................................. 244/46; 244/13
(58) Field of Classification Search .............. 244/34 R, 244/45 R, 46, 48, 34 A, 35 R, 39
See application file for complete search history.

(56) References Cited

U.S. PATENT DOCUMENTS

| | | | | |
|---|---|---|---|---|
| 3,361,388 A | * | 1/1968 | Girard et al. | ................. 244/48 |
| 3,572,614 A | | 3/1971 | Bertelsen | |
| 4,415,131 A | * | 11/1983 | Bertelsen et al. | .............. 244/13 |
| 4,601,443 A | * | 7/1986 | Jones et al. | ................... 244/13 |

OTHER PUBLICATIONS

Advanced Technology Deflected Slipstream, not earlier than Mar. 3, 2004, 23 pgs.
William D, Bertelsen, Introduction to the Arcopter Arc Wing..;Science and Technology of Low Speed and Motorless Flight, NASA Conference Publication 2085, Part 1, pp. 103-129.
Perry W. Hanson, Science and Technology of Low Speed and Motorless Flight, NASA Conference Publication 2085 Part I, 1979, pp. 103-129.

\* cited by examiner

*Primary Examiner*—Timothy D Collins
(74) *Attorney, Agent, or Firm*—Reising, Ethington, Barnes, Kisselle, P.C.

(57) ABSTRACT

An aircraft is provided with a wing assembly mounted in a slipstream of a source of propulsion of the aircraft. The aircraft includes a body having a longitudinal axis, a wing assembly carried by the body and including a moveable portion moveable relative to the body and a wing carried by the moveable portion. A first actuator is coupled to the moveable portion to move it relative to the body in a direction generally parallel to the axis of the body. A second actuator is coupled to the wing to move the wing relative to the moveable portion and between first and second positions. The second actuator at least selectively permits uninhibited pivoted movement of the wing relative to the body in response to aerodynamic forces acting on the wing so that the wing may pivot to a position wherein the forces acting on the wing are balanced.

23 Claims, 14 Drawing Sheets

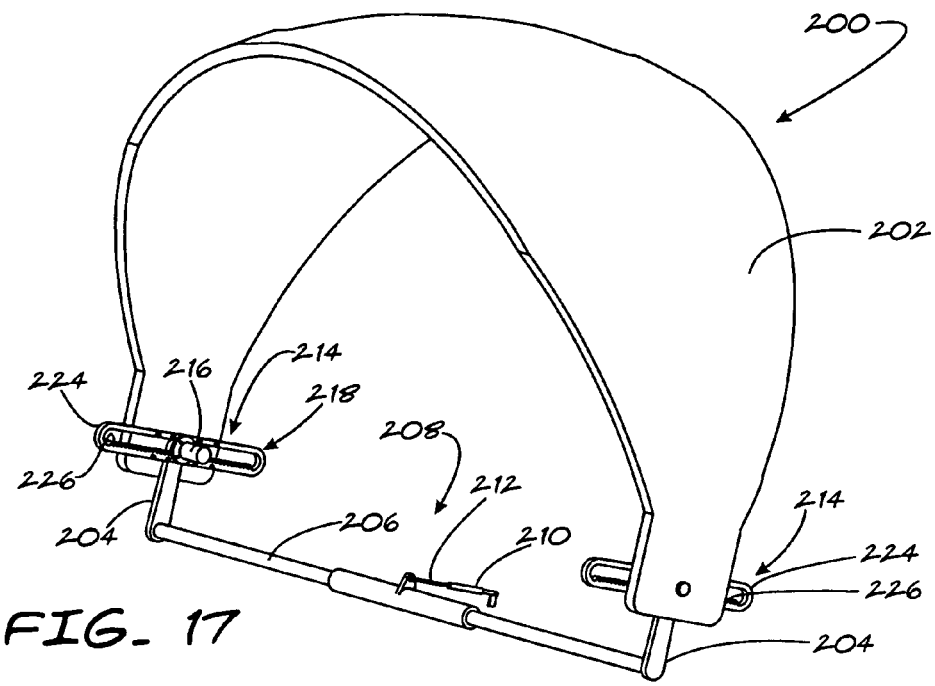
FIG. 17
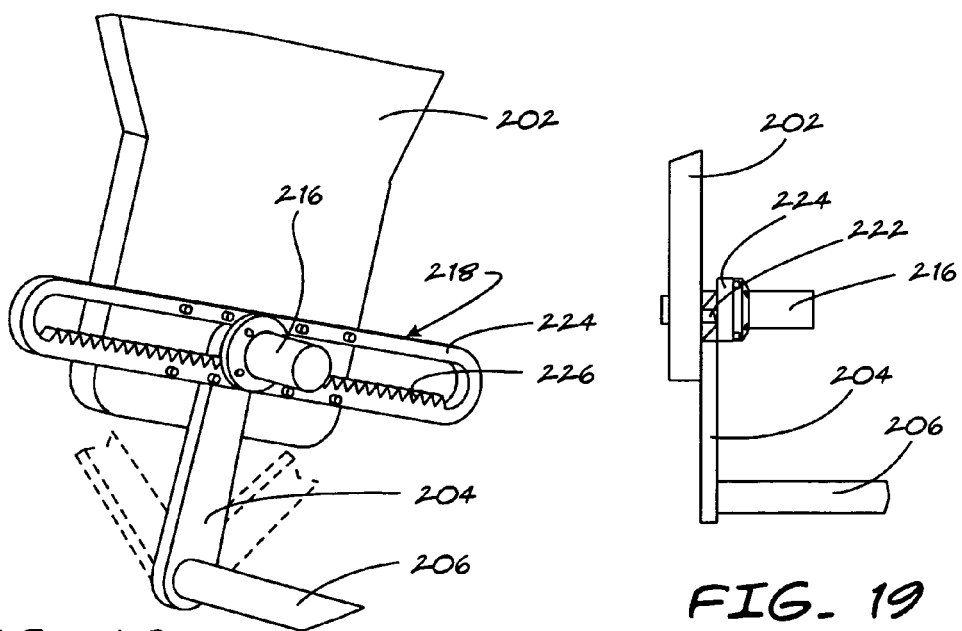
FIG. 18
FIG. 19

US 7,510,143 B1

WING ASSEMBLY AND AIRCRAFT

REFERENCE TO CO-PENDING APPLICATION

This application claims the benefit of U.S. Provisional Patent Application Ser. No. 60/658,241, filed Mar. 3, 2005 which is incorporated herein by reference in its entirety.

FIELD OF THE INVENTION

This invention relates generally to aircraft, and more particularly to aircraft having a source of propulsion with a wing assembly disposed in a slipstream of the propulsion.

BACKGROUND OF THE INVENTION

Aircraft employing an airfoil in a slipstream of a propeller to achieve vertical takeoff and landing (VTOL) are known. Aircraft of this type have been met with varied success due to the challenges in transitioning between vertical flight and normal horizontal flight. When transitioning between the vertical and horizontal flight, pitch control, pitch trim and pitch stability are difficult to regulate, thereby providing a pilot with extremely difficult flying challenges.

SUMMARY OF THE INVENTION

An aircraft is provided with a wing assembly mounted in a slipstream of a source of propulsion of the aircraft. The aircraft includes a body having a longitudinal axis, a wing assembly carried by the body and including a moveable portion moveable relative to the body and a wing carried by the moveable portion. A first actuator is coupled to the moveable portion to move it relative to the body in a direction generally parallel to the axis of the body. A second actuator is coupled to the wing to move the wing relative to the moveable portion and between first and second positions. The second actuator at least selectively permits uninhibited pivoted movement of the wing relative to the body in response to aerodynamic forces acting on the wing so that the wing may pivot to a position wherein the forces acting on the wing are balanced.

In one implementation, the first and second actuators are coupled to the wing through respective first and second carriages that permit generally linear movement of the moveable portion of the wing assembly and the wing. The wing assembly is also permitted to pivot so that the wing may readily reach a position wherein the forces acting on the wing are balanced to provide pitch control, pitch trim and pitch stability in a wide range of flight modes and preferably even during rapid transitions between flight modes. In another implementation, the wing is carried by a wing spar that is moveable relative to the body of the aircraft. The wings are moveable relative to the wing spar, and the wing spar is carried by the body for pivoted movement to provide the desired adjustment and movement of the wing assembly and wing in operation of the aircraft. In yet another implementation, the wing spar is carried by the body for pivoted movement and the wing is carried for pivoted and translational movement relative to the wing spar. This permits the desired adjustment and movement of the wing assembly and wing in operation of the aircraft.

BRIEF DESCRIPTION OF THE DRAWINGS

These and other objects, features and advantages of the aircraft and wing assembly will be apparent from the following detailed description of presently preferred embodiments, best mode, appended claims and accompanying drawings, in which:

FIG. 17 is a perspective view of a modified wing assembly for an aircraft;

FIG. 18 is a fragmentary perspective view of a second carriage of the wing assembly of FIG. 17;

FIG. 19 is a fragmentary end view of the second carriage;

DETAILED DESCRIPTION OF PREFERRED EMBODIMENTS

Figure 1:
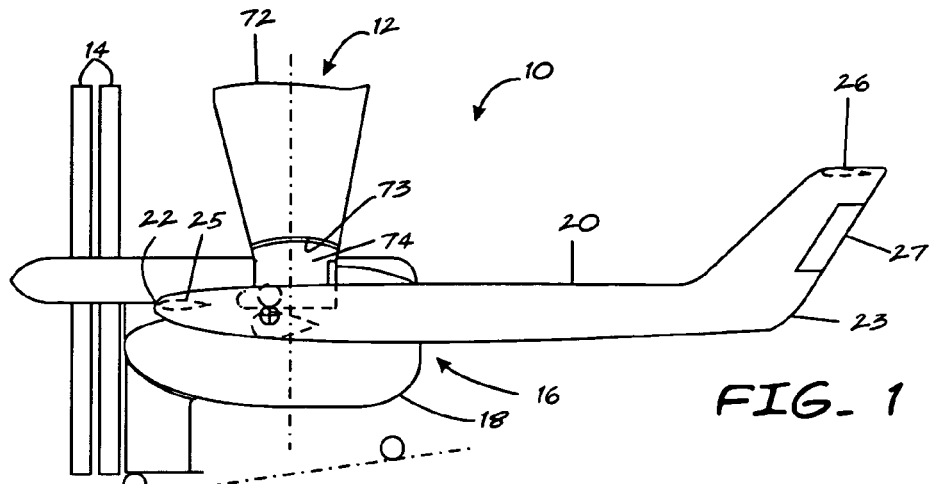
FIG. 1 is a side elevation view of an aircraft having one presently preferred embodiment of a wing assembly.
Figure 2:
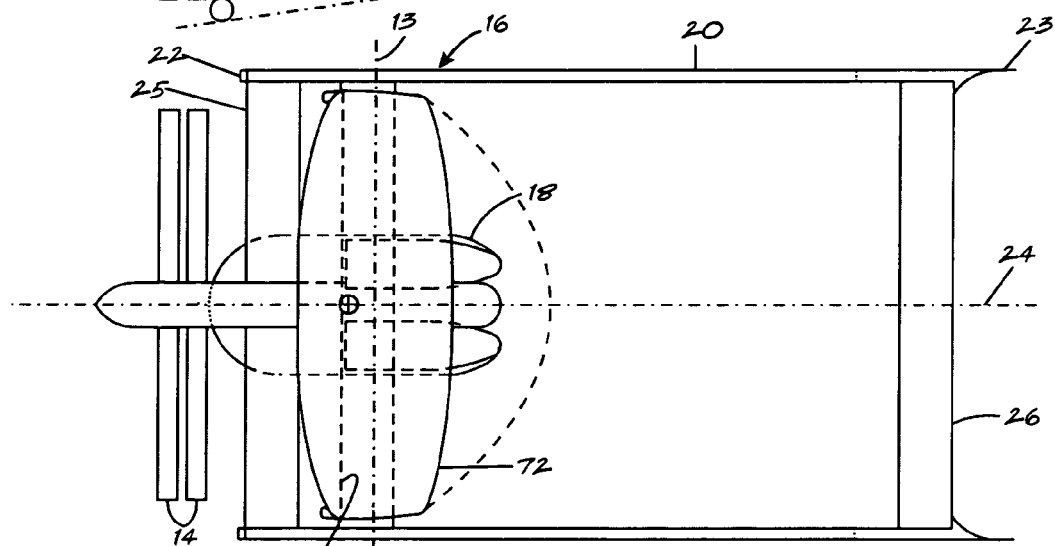
FIG. 2 is a plan view of the aircraft of FIG. 1.
Figure 3:
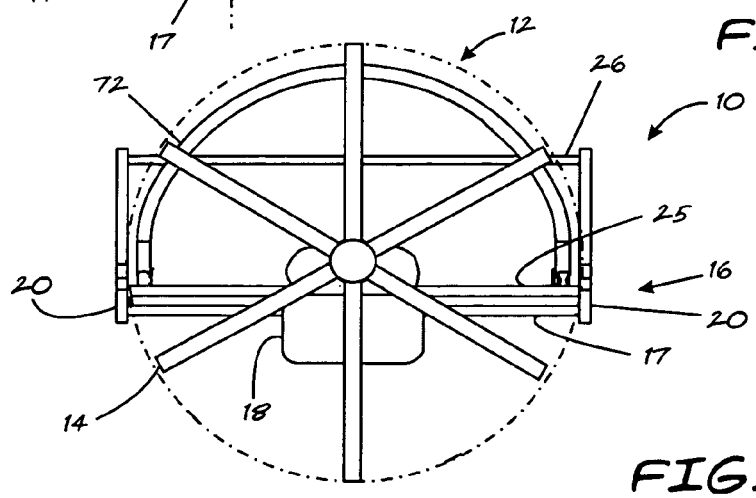
FIG. 3 is a front elevation view of the aircraft of FIG. 1.

Referring in more detail to the drawings, FIGS. 1-3 illustrate an aircraft 10 having one presently preferred embodiment of a wing assembly 12. The wing assembly 12 is disposed in a slipstream of a source of propulsion, represented here, by way of example and without limitations, as a propeller or pair of counter-rotating propellers 14 carried by a body or fuselage 16. The wing assembly 12 could include a flap or flaps (not shown) to facilitate re-direction or deflection of the propeller slipstream to generate lift. The wing assembly 12 is carried by the fuselage 16 by a horizontal spar 17 (FIGS. 3 and 8) and is moveable for generally linear translation and pivotal movement relative to the fuselage 16 to provide the aircraft 10 with a variety of in-flight modes of operation. For example, the wing assembly 12, when oriented in one position, provides the aircraft 10 with an ability to fly straight vertically, which is generally desirable for vertical takeoffs and landings, and when oriented in another position, enables the aircraft 10 to fly horizontally, such as during a cruise or normal operating mode of flight. The wing assembly 12 provides the aircraft 10 with inherent pitch and yaw stability, without a tail, as a result of a dynamic lift/drag force balance about a horizontal axis 13 extending between opposite wing tips of the wing assembly 12.

As shown in FIGS. 2 and 3, by way of example and without limitations, the fuselage 16 has a generally central payload or cargo cabin 18 and a pair of outwardly flanking, laterally spaced tail booms 20. The tail booms 20 extend between front and rear ends 22, 23 and are generally parallel to each other and a longitudinal axis 24 (FIG. 2) of the fuselage 16. The front ends 22 of the tail booms 20 are preferably attached to the cabin 18 via horizontal canards 25, and the rear ends 23 of the tail booms 20 are preferably attached to one another via a horizontal stabilizer 26. Each tail boom 20 preferably has a vertical stabilizer or rudder 27 defining in part the rear ends 23.

Figure 7:
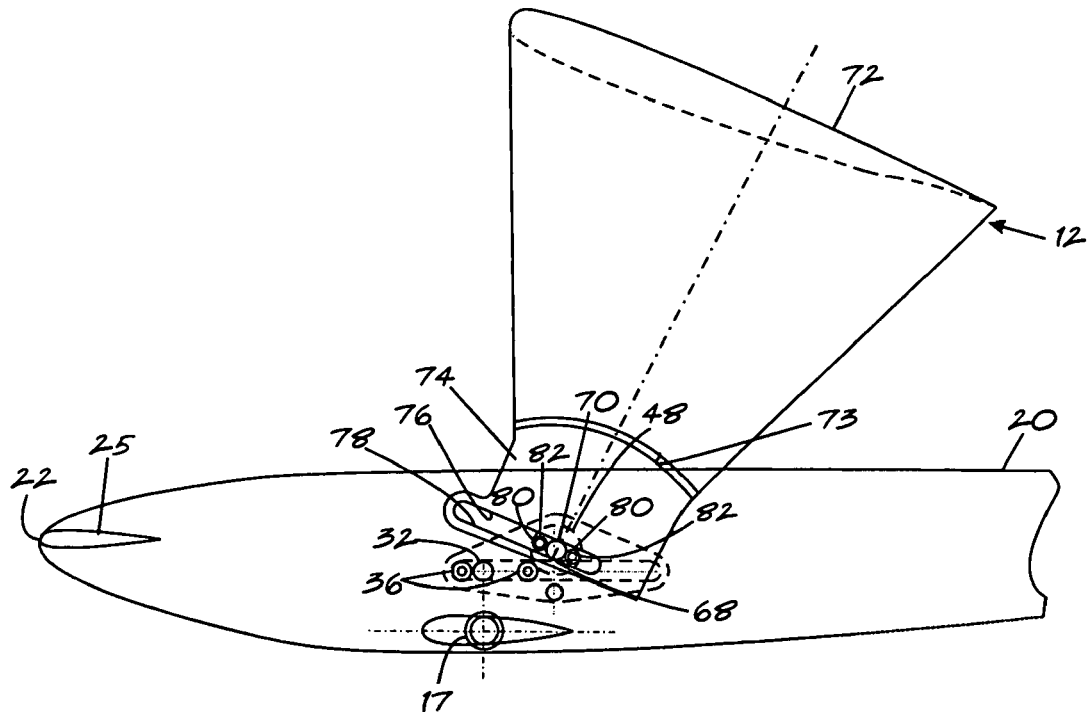
FIG. 7 is a view similar to FIG. 4 showing the wing assembly in a rearward position.
Figure 8:
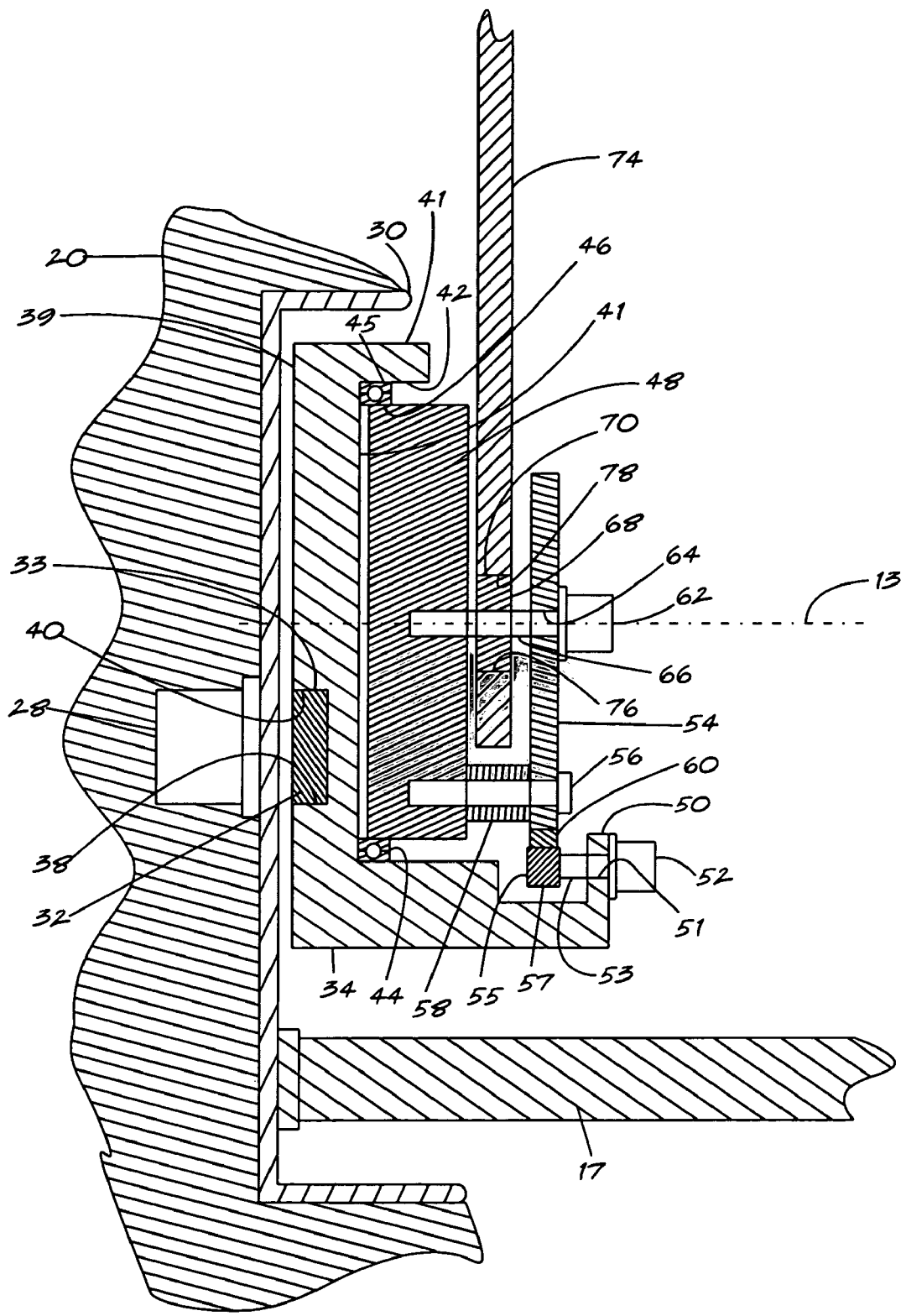
FIG. 8 is a cross sectional view taken generally along line 8-8 of FIG. 4.

As shown in FIG. 8, at least one and preferably a pair of first actuators, represented here, by way of example and without limitations, as a pair of drive motors 28, are carried by each of the tail booms 20 of the fuselage 16. The drive motors 28 are mounted in generally mirrored relation to one another to support brackets 30 that are each fixed to a separate one of the tail booms 20. The drive motors 28 have drive gears 32 driven for clockwise and counterclockwise rotation in response to actuation of the motors 28. The drive gears 32 are arranged for meshed engagement with respective center of lift shift carriages, referred to hereafter as first carriages 34. A guide member, and represented here, by way of example and without limitations, as a pair of rollers 36 (FIG. 7), is carried by the respective tail boom 20 for generally free rotation on opposite sides of each drive gear 32. The rollers 36 are mounted to the brackets 30 in laterally spaced relation and at a predetermined distance from the respective drive gears 32. The rollers 36 and respective drive gears 32 are generally coplanar and preferably lie along an imaginary line that is generally parallel to the longitudinal axis 24 of the fuselage 16. The drive motors 28 are represented here, by way of example and without limitations, as electric motors, though it is contemplated that hydraulic, pneumatic, magnetic, and also that linear actuators, such as ball screws, or other powered actuators could be used.

Figure 9:
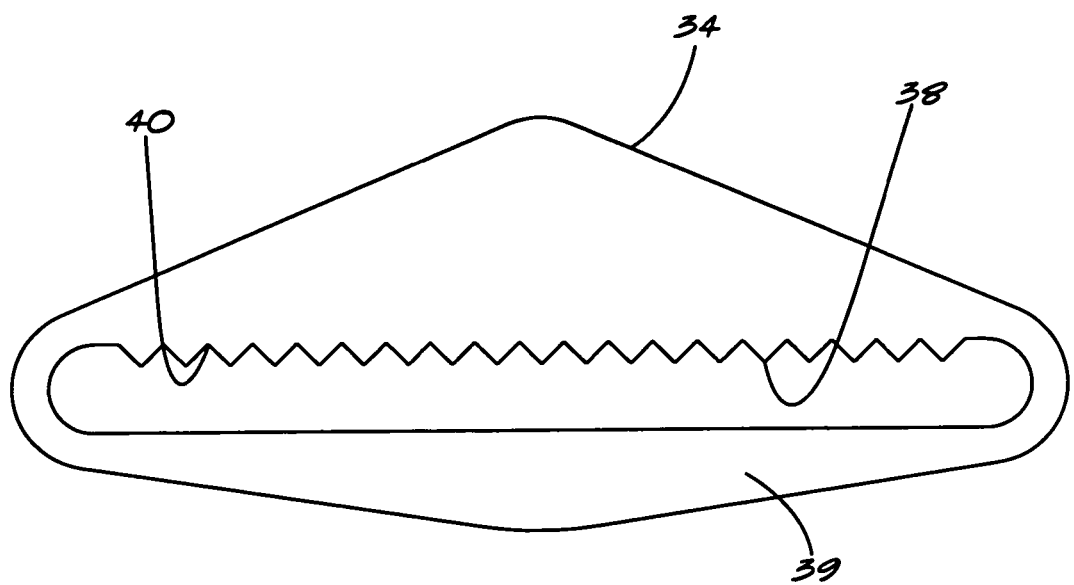
FIG. 9 is a side elevation view of a portion of a first carriage of the wing assembly.

The first carriages 34 are carried by the tail booms 20 for linear translation relative to the tail booms 20 in response to actuation of the drive motors 28. The first carriages 34 are represented here, by way of example and without limitations, as having elongate slots or channels 38 in a first side 39 (FIGS. 8 and 9), wherein the channels 38 extend generally parallel to the longitudinal axis 24 of the fuselage 16. The channels 38 preferably have gear teeth 40 arranged for meshed engagement with teeth 33 on the drive gears 32, such that a commanded degree of rotation of the drive gears 32 causes a predetermined linear fore or aft translation of the first carriages 34 relative to the fuselage 16. In this manner, the wing assembly 12 includes moveable and unmovable portions that are fixed to the aircraft and carry the moveable portions to permit adjustment of the wing assembly as noted hereinafter. The first actuators 28 are coupled to the moveable portion of the wing assembly 12 to drive the wing assembly for movement relative to structural portions of the aircraft.

Figure 10:
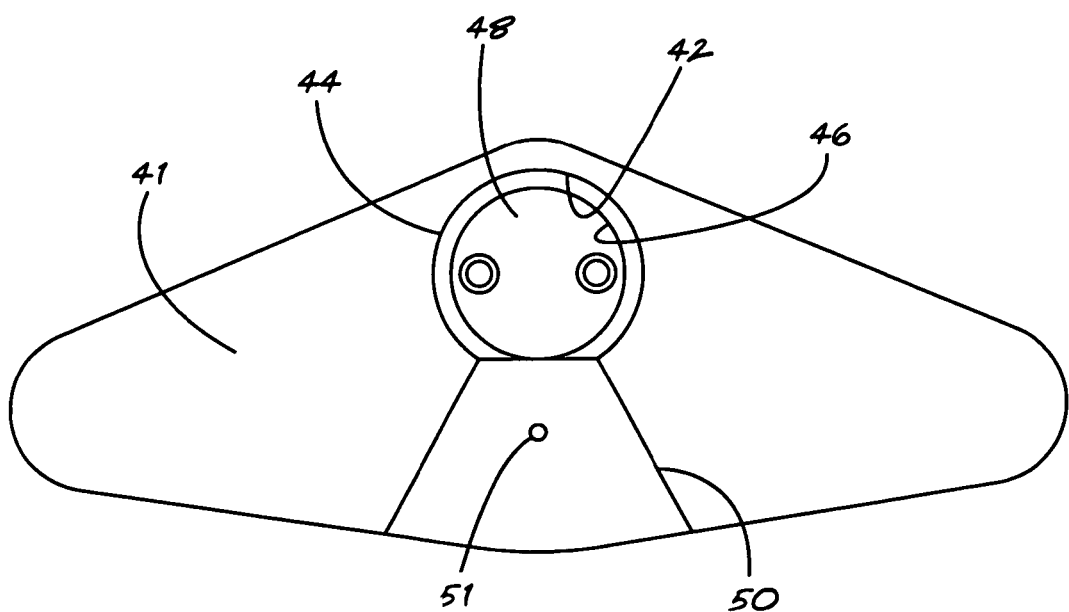
FIG. 10 is another side elevation view of the carriage of FIG. 9.

The first carriages 34 have a second side 41 (FIG. 10) with a recessed pocket or housing 42 sized to receive at least part of a bearing which is represented here, by way of example and without limitations, as a roller bearing 44. Each roller bearing 44 has an outer ring 45 fixed to the respective first carriage 34, such as through a tight or press fit within the housings 42. The bearings 44 have an inner ring with a bore 46 sized to receive a rotatable disc 48 therein. The disc 48 is preferably sized for a tight or press fit within the bore 46 such that the disc 48 and inner ring co-rotate about the laterally extending axis 13 that is generally perpendicular to the fuselage axis 24. An upstanding flange 50 is spaced laterally outwardly from the side 41 and has a through opening 51 sized for receipt of a shaft 53 of a second actuator, represented here, by way of example and without limitations, as an electric motor 52 generally the same as the motor 28 described above. The shaft 53 supports a drive or lock member, represented here as a gear 55 with gear teeth 57 adjacent its free end for conjoint rotation with the shaft 53 upon actuation of the motor 52.

A wing tilt mount plate, referred to hereafter as mount plate 54 is operably fixed to the disc 48 via a plurality of fasteners, such as machine screws 56, for example. The mount plate 54 is spaced laterally outwardly from the disc 48, such as by spacers 58, for example, thereby defining a space between the disc 48 and the mount plate 54. The mount plate 54 preferably has gear teeth 60 along a bottom sector thereof for meshing engagement with the gear teeth 57 of the gear 55. The mount plate 54 provides a mounting surface for a third actuator, represented here, by way of example and without limitations, as a wing shift electric drive motor 62. The mount plate 54 has a through opening 64 sized for receipt of a shaft 66 of the drive motor 62 for relative rotation of the shaft 66 within the opening 64 upon actuation of the motor 62. The shaft 66 supports a drive member adjacent its end, represented here as a gear 68 with gear teeth 70, for example.

The wing assembly 12 is represented here, by way of example and without limitations, as having a single a wing portion 72 extending between opposite wing tips 73 (FIG. 4) and a pair of zero pitch moment tilt carriages, referred to hereafter as second carriages 74 attached to the tips 73. The wing portion 72 is preferably arcuate, generally semicircular or c-shaped. However, the wing portion 72 could be formed otherwise, such as, by way of example and without limitations, by a plurality of generally flat surfaces (not shown) joined to one another in generally stepped fashion, or alternatively, could be formed as a generally flat wing portion with sides extending generally perpendicularly therefrom for attachment to the second carriages 74. The wing portion 72 is preferably constructed of a lightweight composite material or woven high strength fabric, or any other suitable wing material. However, the wing assembly 12 could be constructed having multiple wing portions pivotal relative to one another, as disclosed in U.S. Pat. No. 3,572,614 to Bertelsen, which is incorporated herein by reference in its entirety. The second actuators 52 are coupled to the wing 72 to move the wing relative to the first carriages 34.

As best shown in FIGS. 4-8, the second carriages 74 are arranged to be carried by the first carriages 34 via generally elongate slots 76 with gear teeth 78 arranged for meshed engagement with the gear teeth 70 of the gears 68. The slots 76 extend a predetermined length to provide the desired amount of linear adjustment of the wing portion 72 in a generally fore and aft direction in response to actuation of the motor 62 (FIG. 8). In addition to receiving the gears 68, each of the slots 76 receive at least one guide roller, and represented here, by way of example and without limitations, as a pair of guide rollers 80 (FIGS. 4-7) on opposite sides of the respective gear 68. The guide rollers 80 are attached for free rotation adjacent free ends of shafts 82, with one end of the shafts 82 being fixed to the discs 48, such as through a press fit into an opening in the discs 48, threaded engagement within threaded openings in the discs 48, or a weld joint, for example. As such, the shafts 82 move conjointly with the discs 48, and thus, any tilting movement of the wing portion 72 causes conjoint rotation of the discs 48 via the rollers 80 and the shafts 82.

To distribute the lift created by the wing assembly 12 generally over the center of gravity of the aircraft 10, the first actuators 28 are commanded to rotate the drive gears 32 in a clockwise or counterclockwise direction, depending on the location of the aircraft's center of gravity. Upon actuation of the first actuators 28, the gear teeth 40 in the slots 38 engage the drive gears 32, thereby causing the first carriages 34 to translate horizontally either fore or aft relative to the fuselage 16. As the first carriages 34 translate fore and aft, the mount plates 54, and thus, the third actuators 62 move conjointly with the first carriages. As such, the engagement of the teeth 70 of the gears 68 with the teeth 78 of the slots 76 causes the second carriages 74 to move conjointly generally along the direction of the axis 24 with the first carriages 34. As such, the complete wing assembly 12 moves either fore or aft, depending on the commanded direction of movement of the drive gears 68. In doing so, the channel 38 of each first carriage 34 traverses along at least one of the rollers 36 to shift or transfer the lifting force created by the wing portion 72 generally over the center of gravity of the aircraft 10. The ability to shift the first carriages 34 along the axis 24 of the fuselage 16 allows the lifting forces imparted on the fuselage 16 to pass through the center of gravity of the aircraft via a transferring of forces between the respective rollers 36 carried by the tail booms 20 and the first carriages 34. Accordingly, the first carriages 34 provide an ability to compensate for an axial shift of the aircraft's center of gravity, such as generally occurs with changing payloads or fuel burn-off, for example.

To initiate a rapid, short jump takeoff, or generally straight vertical takeoff, the inclination of the wing portion 72 is altered within the slipstream to deflect the slipstream from the propellers 14 generally vertically downward. To alter the inclination of the wing portion 72 within the slipstream, the third actuators 62 (FIG. 8) are commanded to rotate the gears 68 in a counterclockwise direction as viewed from the motors 62. As such, the gear teeth 70 engage the teeth 78 in the slots 76, thereby causing the second carriages 74 to move relative to the first carriages 34 generally toward the front ends 22 of the tail booms 20. As such, the wing portion 72 is caused to move conjointly with the second carriages 74 forward in the slipstream of the propellers 14.

As the wing portion 72 moves forward in the slipstream of the propellers 14, the resultant vector acting on the wing portion 72 moves ahead and away from the axis 13, creating a pitching moment. Thus, the wing portion 72 pivots generally about the axis 13 in response to the redirected resultant vector. As such, the wing portion 72 is caused to seek its state of equilibrium by pivoting within the slipstream to an increased angle of incidence or attack relative to the slipstream. The pivoting movement of the wing portion 72 is facilitated by the ability of the second carriages 74 to pivot relative to the first carriages 34.

As shown in FIGS. 4-7, the operable coupling of the slots 76 in the second carriages 74 with the guide rollers 80 allows the wing portion 72 to freely pivot via the rotation of the discs 48 in the bearings 44. Preferably, during the desired pivotal movement of the wing portion 72, the second actuators 52 (FIG. 8) remain generally freewheeling, thereby allowing the mount plates 54 to pivot conjointly with the discs 48. As the angle of attack of the wing portion 72 is increased, the slipstream from the propellers 14 is redirected more vertically downwardly, thereby producing a lift force sufficient to cause the aircraft 10 to fly straight up in a vertical direction. It should be noted that if the wing assembly 12 is a single wing element without relatively moveable wing elements like flaps, the turning of the slipstream will be less than 90 degrees. In other words, it will not be directed straight down and so vertical ascension and/or hovering flight may require the plane to assume a nose-up attitude. In one currently preferred implementation, the nose-up attitude needed to achieve vertical flight or hovering is about 30 to 40 degrees to zero or make negligible the forward component and maximize the vertical component or lift. The distance in the shift or translation of the wing portion 72 relative to the horizontal axis 13 to effect pivotal movement of the wing portion 72 between a generally horizontal flight angle of inclination and a stall angle of inclination, such as between 0-72 degrees angle of attack relative to the slip stream, for example, is preferably about ⅓ a maximum chord distance C (FIG. 4) of the wing portion 72, though it could be more or less, depending on the geometry of the wing portion 72.

Figure 4:
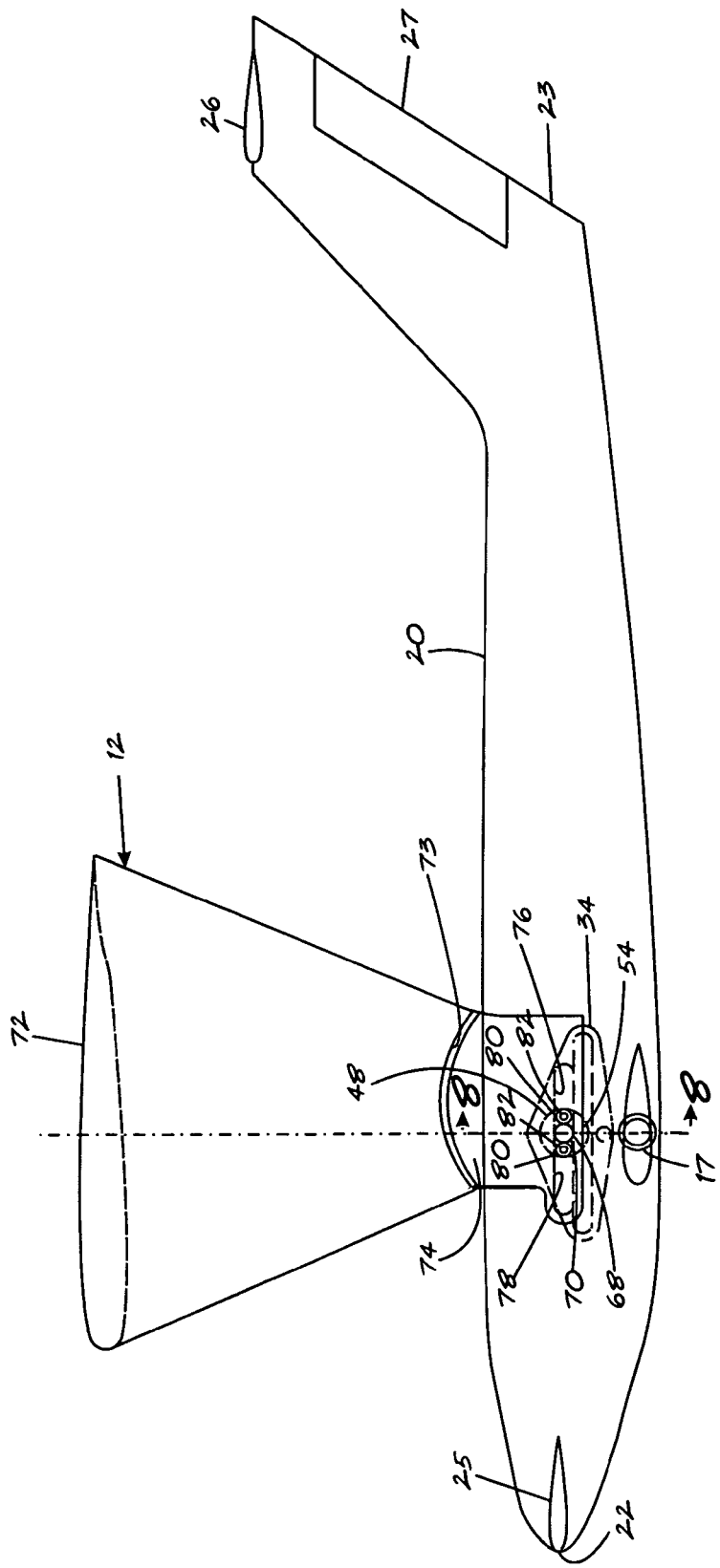
FIG. 4 is a side elevation view of a tail boom of the aircraft showing a presently preferred embodiment of a wing assembly in a horizontal position.
Figure 5:
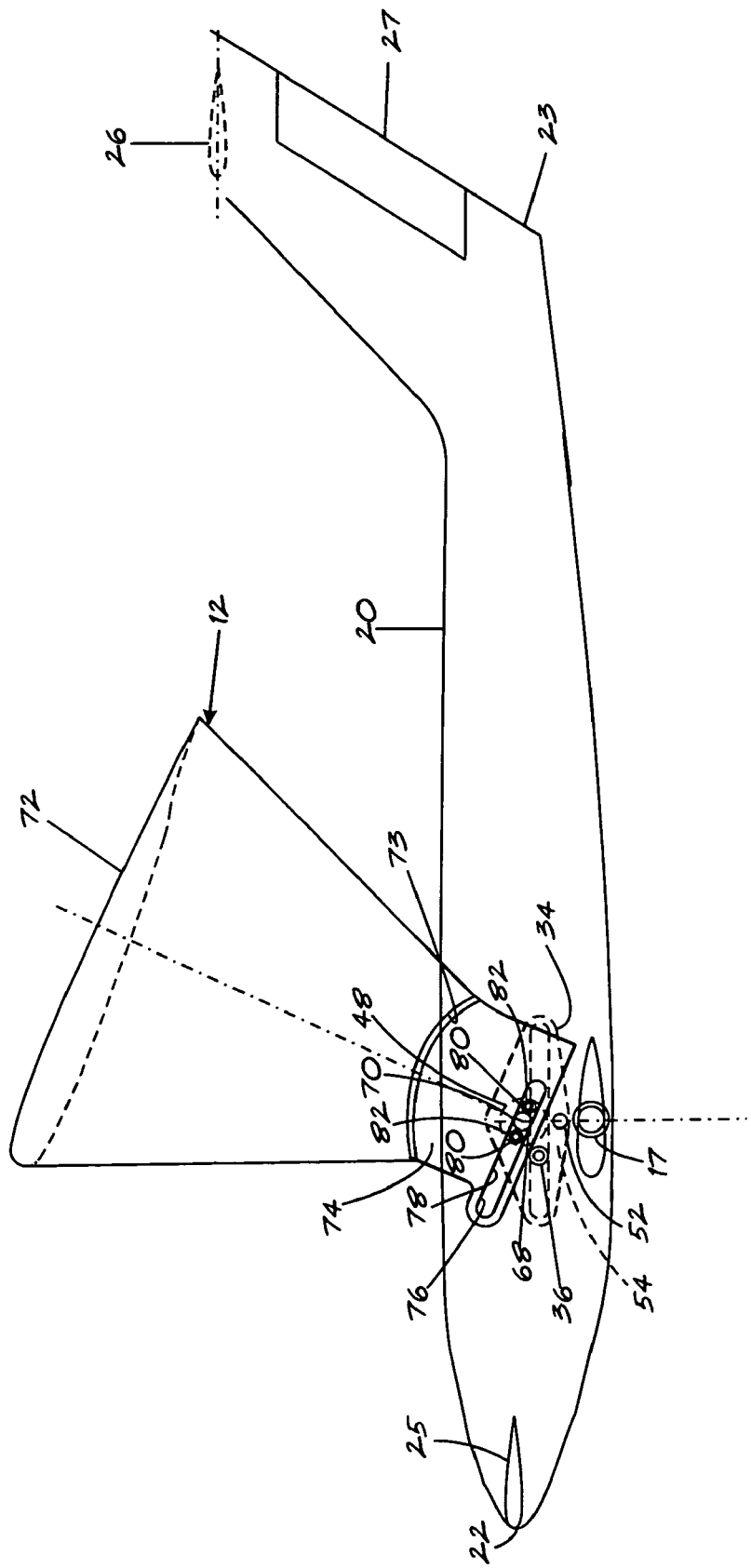
FIG. 5 is a view similar to FIG. 4 showing the wing assembly in an inclined position.
Figure 6:
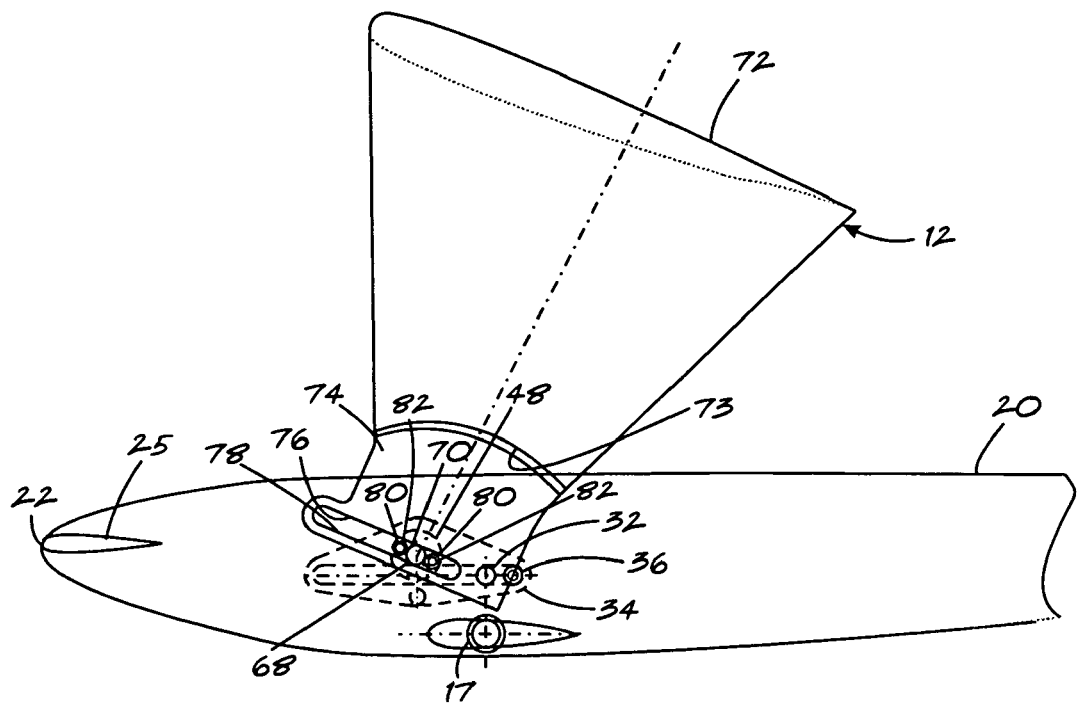
FIG. 6 is a view similar to FIG. 4 showing the wing assembly in a forward position.

Upon reaching the desired altitude, the third actuators 62 are commanded to move the gears 68 in a clockwise direction, thereby causing the second carriages 74 to move rearwardly and generally toward the rear end 23 of the fuselage 16. As a result, the wing portion 72 moves conjointly with the second carriages 74. As the wing portion 72 moves rearwardly in the slipstream, the wing portion 72 automatically pivots, as described above via the free pivoting disc 48, to a decreased angle of incidence or attack relative to the slipstream (FIG. 4). As such, the decreased angle of attack causes the wing portion 72 to assume a normal cruise attitude as the second carriages move aft. The decreased angle of attack causes the slipstream of the propellers 14 to be directed over the wing portion 72 to produce a normal flight sustaining lift force on the wing portion 72, while also allowing the thrust of the slipstream to propel the aircraft in normal cruise or horizontal flight.

As the second carriages 74 move along the guide rollers 80, the second carriages 74 pivot proportionally about the axis 13 to allow the wing portion 72 to remain in a state of equilibrium by pivoting conjointly with the discs 48. As such, whether the angle of attack of the wing portion 72 is minimized (FIG. 4), or increased (FIGS. 5-7), the wing portion 72 attains an angle of attack that imparts a balanced or zero pitch moment on the fuselage 16. Accordingly, the angle of attack of the wing portion 72 is adjusted automatically by controlling the linear position of the second carriages 74 via the third actuator 62. With a zero pitch moment being imparted by the wing portion 72 on the fuselage 16, the aircraft 10 is able to remain in a generally horizontal attitude while flying vertically, horizontally, and during transition between vertical and horizontal flight, without substantial deflection of conventional horizontal control surfaces, as embodied in FIGS. 1-3 by the horizontal canards 25 and the aft horizontal stabilizer 26. Therefore, this may occur without the performance loss incumbent with such control surface deflections. In addition, by the wing portion 72 remaining in a state of equilibrium, the respective actuators 28, 52, 62 remain generally load free, thereby minimizing the amount of drive force required from the respective actuators to cause movement of the first and second carriages 34, 74.

The second actuators 52 in meshed engagement with the mount plate 54 enable the wing portion 72 to be releasably fixed against pivotal movement, such as may be desired while in a cruise mode of flight, for example. The second actuators 52 can be actuated to prevent rotation of the gear 55, thereby causing the teeth 57 of the gear 55 to prevent pivotal movement of the mount plate 54 by engaging the teeth 60 on the mount plate 54. As such, with the mount plate 54 fixed against pivotal movement, the discs 48 are fixed against rotation within the bearings 44, thus, temporarily locking the wing portion 72 in a fixed angle of inclination within the slipstream. In addition to locking the wing portion 72 against pivotal movement, the second actuators 52 can be actuated to drive the wing portion 72 for pivotal movement, as desired, by driving the mount plate 54 for rotation via the meshing engagement of the gear teeth 57 with the teeth 60 of the mount plate 54. Though, it should be recognized that the second actuators 52, while in a normal mode of operation, generally allow the mount plates 54, discs 48, and wing portion 72 to freely rotate so that a zero pitch moment is imparted on the fuselage 16 from the lift forces produced by the wing assembly 12.

Desirably, the flow of air over the wing portion 72 remains stable or attached, regardless of the position of the wing portion 72 within the slipstream. The attached flow is maintained by limiting the degree of movement of the wing portion 74 between a predetermined increased angle of attack (FIGS. 5-7), such as about 36 degrees from vertical, for example, and a decreased angle of attack (FIG. 4), such as about 0 degrees from vertical, for example. The wing portion 72 can preferably be arranged to attain a parachute condition or mode to maximize the deceleration of the aircraft 10. Generally, the parachute mode is achieved by moving the wing portion 72 to a maximum inclination relative to the slipstream, thus acting generally as a parachute to substantially block the slipstream from propelling the aircraft in the horizontal direction. As such, the flow of the slipstream is substantially interrupted, and thus, the air flow becomes separated over the wing portion 72. Upon decelerating to the desired air speed, the wing portion 74 can be moved to a lessened degree of inclination, thereby re-establishing attached air flow over the wing portion 72. With the attached air flow re-established, the aircraft 10 is able to maintain a controlled combination of horizontal and/or vertical flight. All of the above maneuvers, including parachute mode and the recovery therefrom, can be done while maintaining pitch stability and without a pitching moment.

FIGS. 11-16 illustrate a second implementation of a wing assembly 112 for an alternate aircraft 110. The aircraft 110 may be of a different construction than the aircraft 10. The aircraft 110 may include a single tail section extending in-line and rearwardly of the fuselage 116 and having a vertical stabilizer 118. Forward of the fuselage 116, horizontal canards 120 and a vertical canard 122 may extend outwardly from a nose section 124 of the aircraft 110. The counter-rotating propellers 14 are mounted on the nose section 124 and may be generally of the same construction and arrangement as in the aircraft 10. The principles of operation in flight, including the various in-flight modes of the aircraft 110 and the associated translational and pivoted movement of the wing assembly 112, are the same as set forth above for the wing assembly 12 and hence, will not be described again. The mechanisms and assembly for the translational and pivoted movement of the wing assembly 112 are different from that set forth above, and will be set forth in more detail below.

Figure 11:
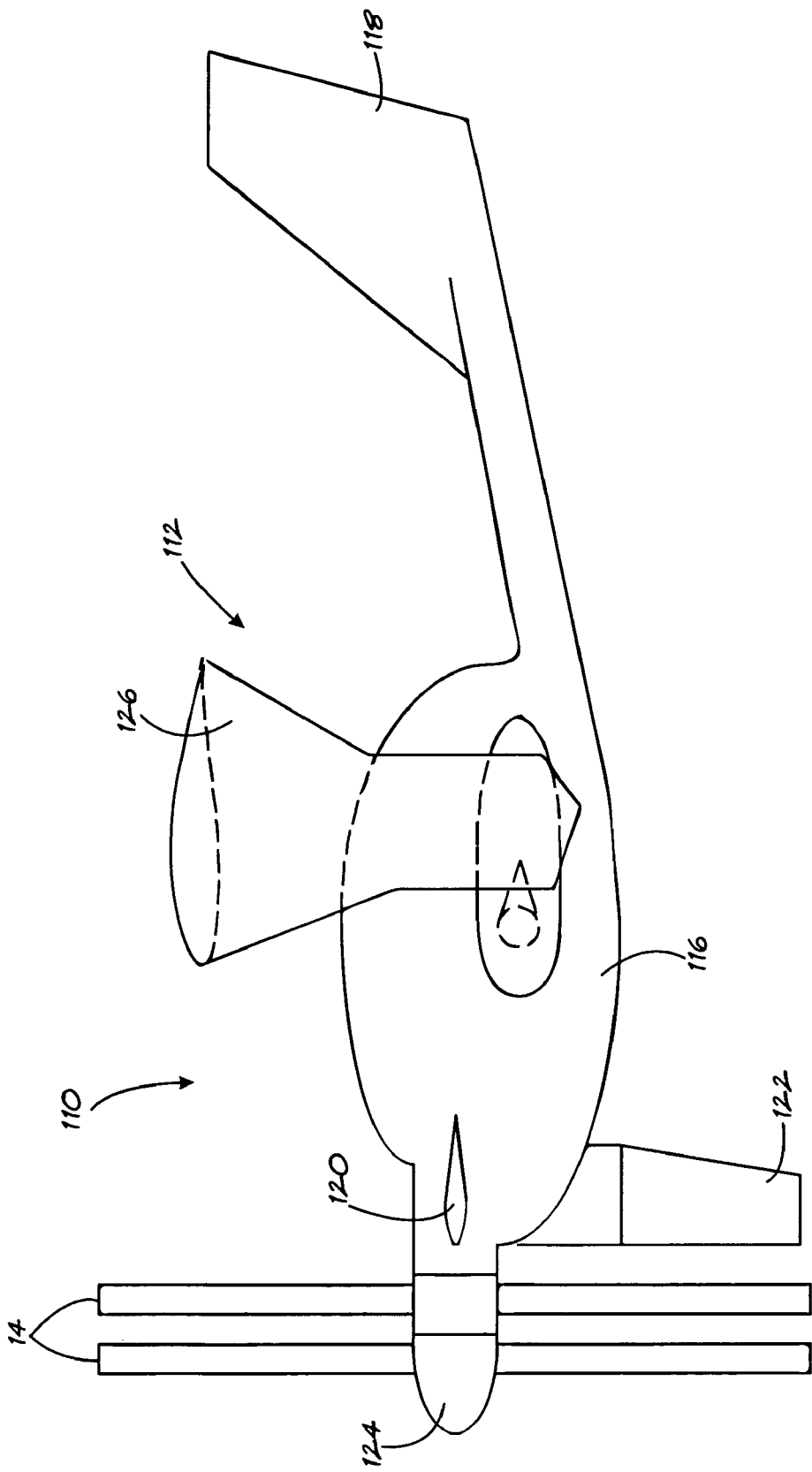
FIG. 11 is a side elevation view of a modified aircraft.
Figure 12:
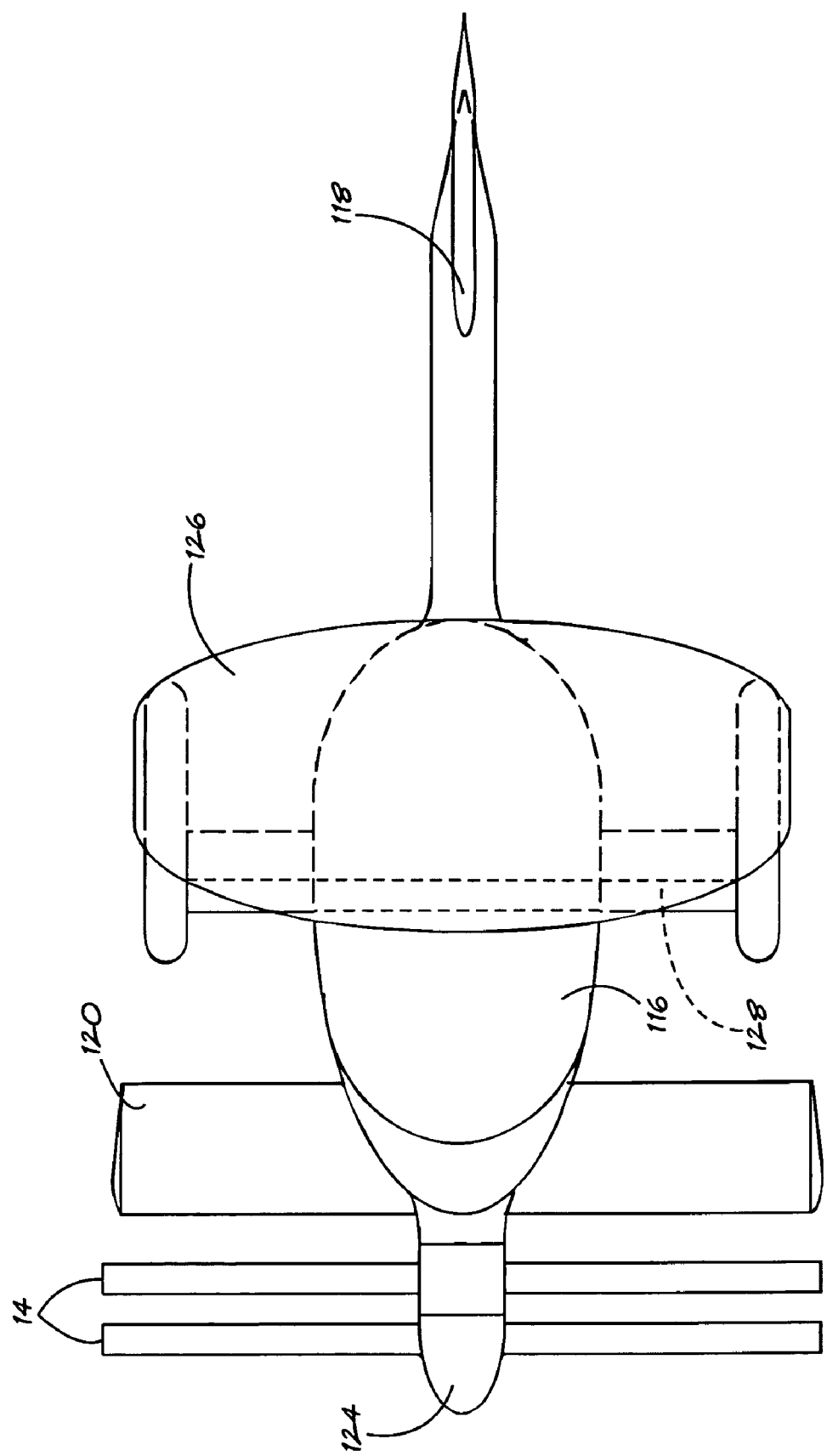
FIG. 12 is a plan view of the aircraft of FIG. 11.
Figure 13:
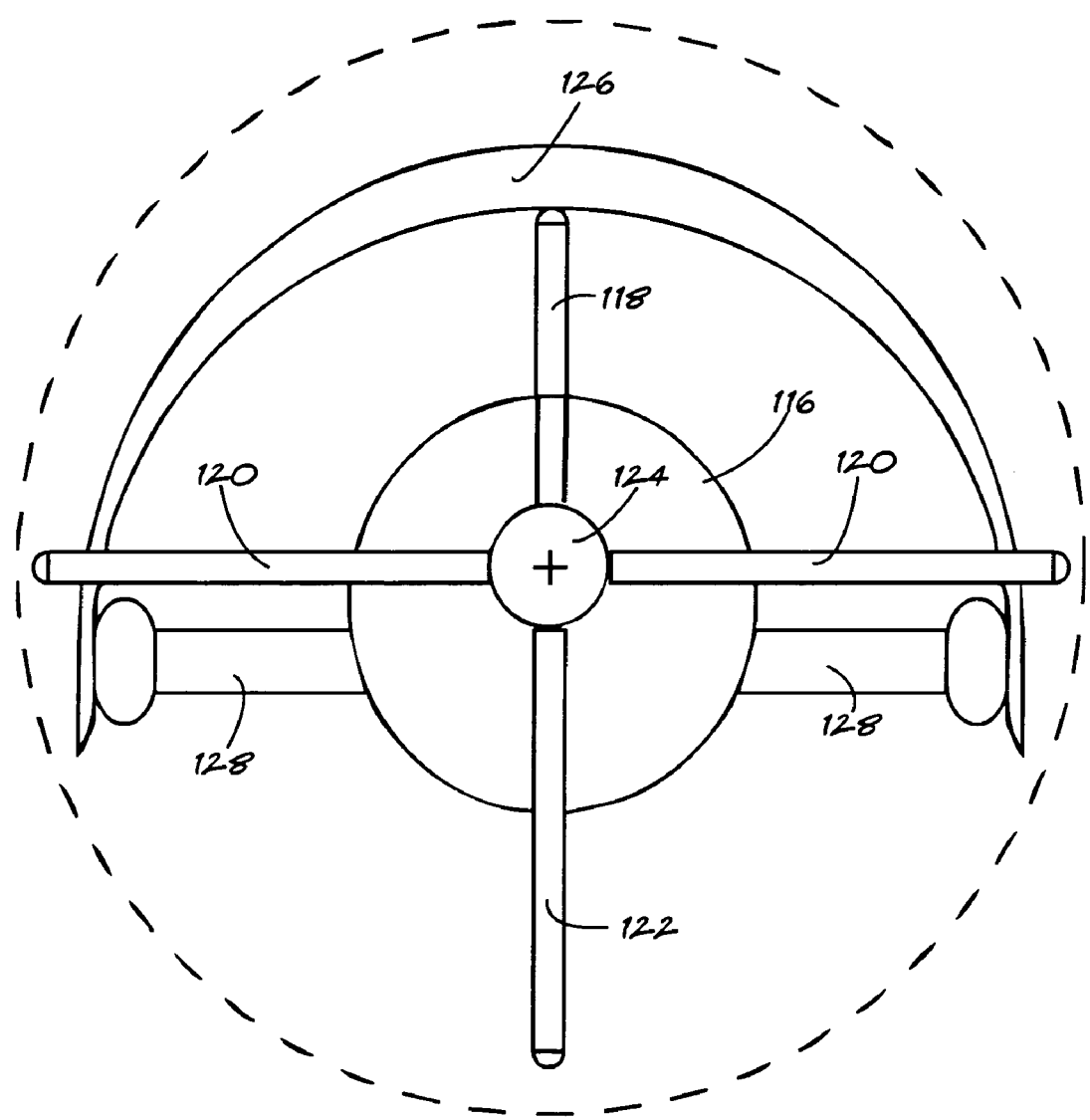
FIG. 13 is a front elevation view of the aircraft of FIG. 11.
Figure 14:
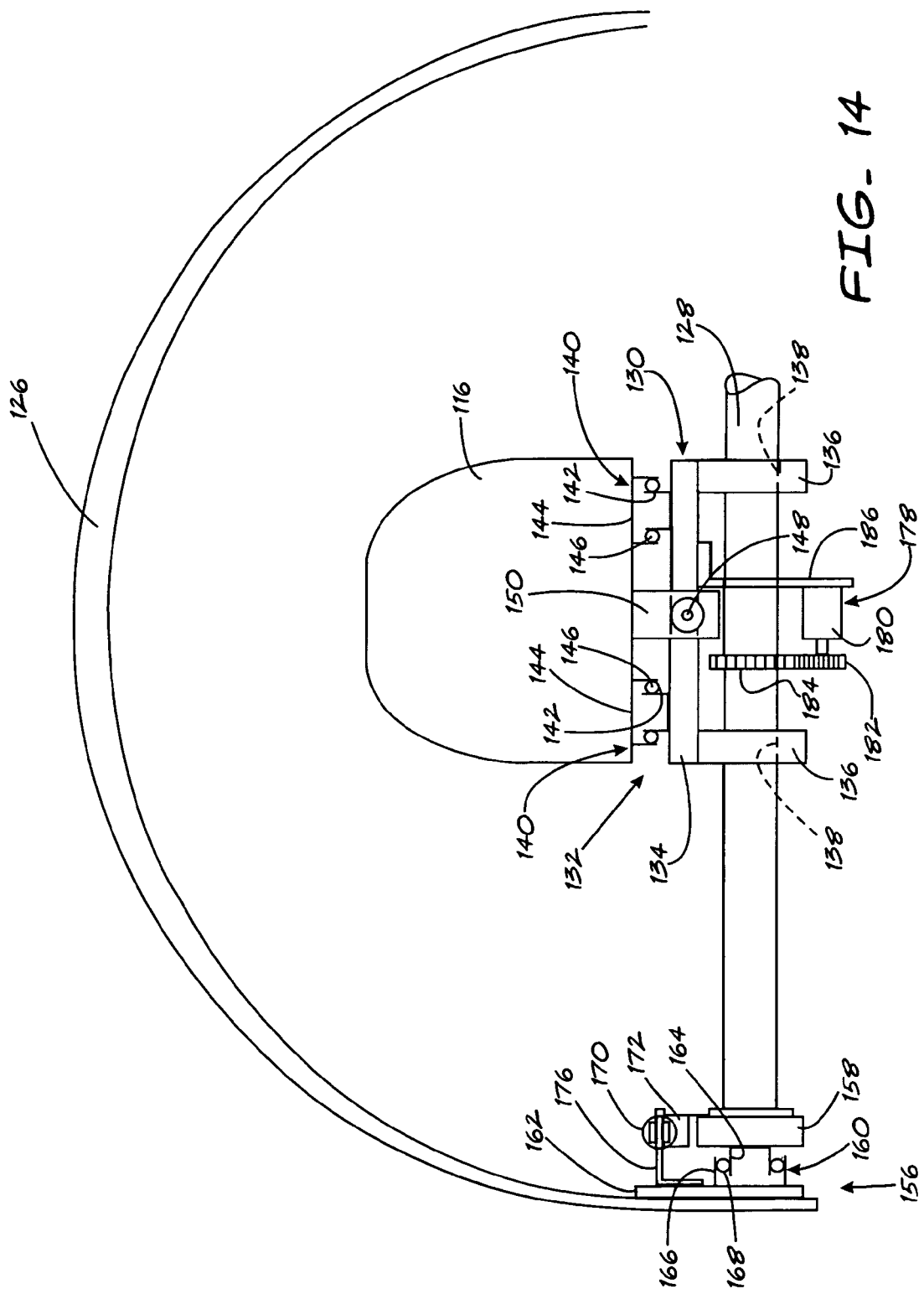
FIG. 14 is a fragmentary sectional view partially in section of the aircraft of FIG. 11.
Figure 15:
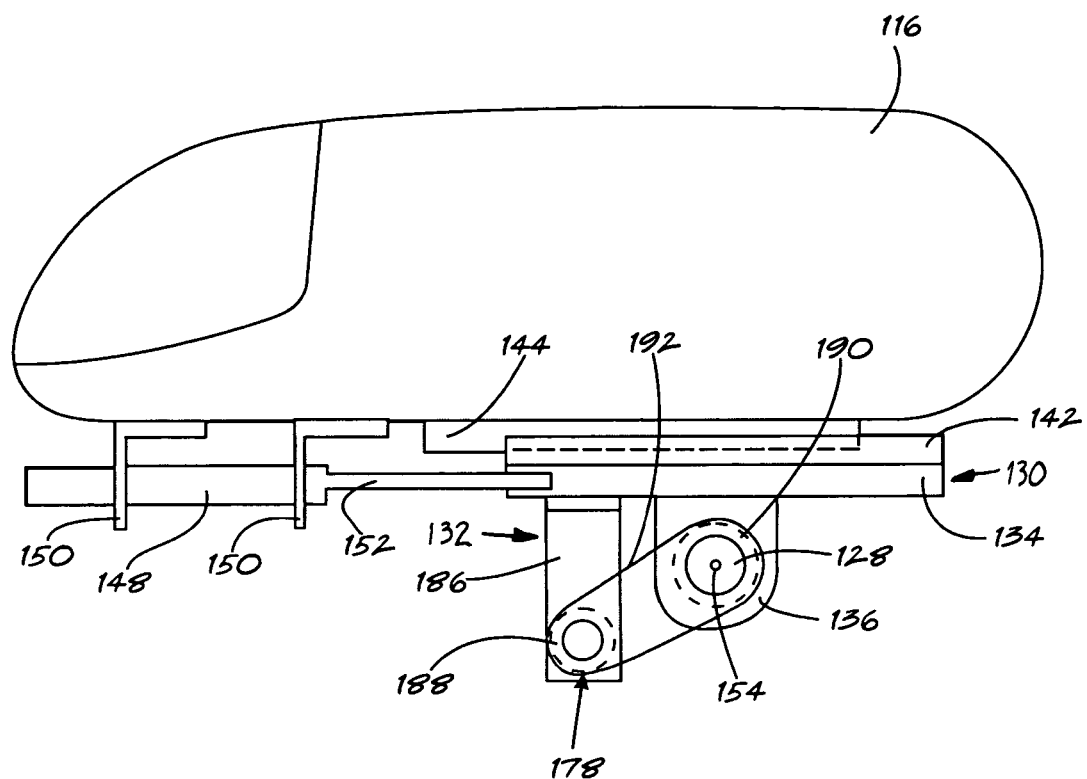
FIG. 15 is side elevation view of a fuselage illustrating an actuator for adjustment of the position of a wing spar that is shown in an alternate position beneath the fuselage.
Figure 16:
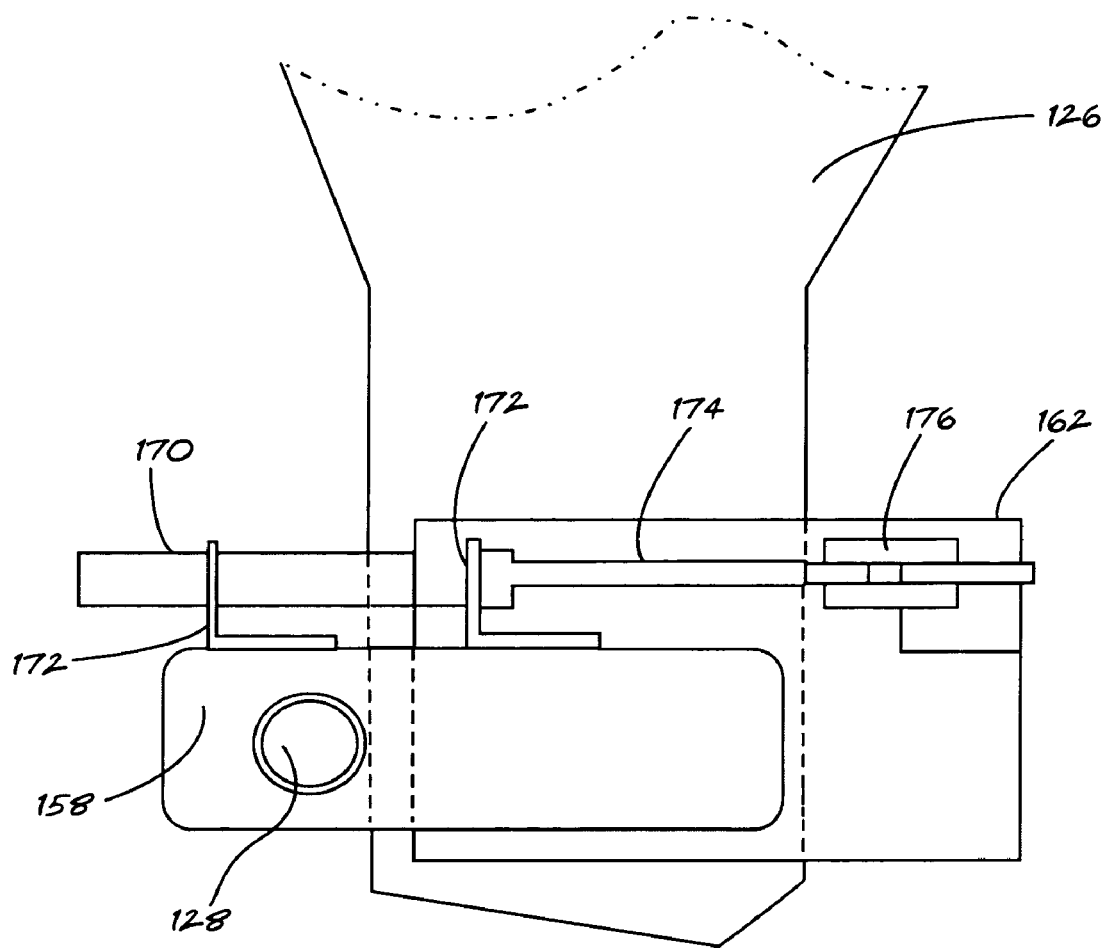
FIG. 16 is fragmentary view of an assembly for adjusting the position of a wing of the aircraft with respect to a wing spar.

As best shown in FIGS. 12-14, the wing 126 preferably is constructed and arranged in a similar manner to the wing 72 previously described. The wing 126 is carried on a tubular spar 128 that in FIGS. 11-13 is shown extending into the fuselage 116 and in FIGS. 14-16 is shown extending below the fuselage. The wing spar 128 could be disposed above the fuselage 116 or in any other desired position.

As best shown in FIGS. 14 and 15, the wing spar 128 is carried by a bracket 130 that is in turn slidably connected to the fuselage 116 by one or more first carriages 132. The bracket 130 includes a platform 134 and a pair of depending flanges 136 each having an opening 138 through which the wing spar 128 extends. To permit linear translation or movement of the bracket 130 and hence, the wing spar 128, relative to the fuselage 116, one or more slides or linear bearings 140 are disposed between the platform 134 and the fuselage 116. One track 142 of each linear bearing 140 is secured to the platform 134, the mating track 144 of each linear bearing is secured to the fuselage 116 and ball bearings 146 are retained between the tracks 142, 144 in known manner. A first actuator 148 preferably is fixed to the fuselage 116 by one or more brackets 150 and is connected to the bracket 130 to drive the wing spar 128 forward and rearward relative to the fuselage 116. The actuator 148 may be of any suitable design and construction including linear actuators like, by way of examples without limitation, a fluid cylinder, ballscrew drive, or a motor. The actuator 148 preferably includes a ram or other drive member 152 that is connected to the bracket 130 to move the bracket 130 and hence, the wing spar 128 relative to the fuselage 116. This shifts the center of lift which preferably is coincident with a central axis 154 of the wing spar 128. Hence, the wing assembly 112 has a moveable portion that includes the moving portions of the first carriages 132 and the wing spar that moves therewith. Nonmoving portions of the first carriages 132 are fixed to or otherwise carried by the fuselage 116 or other structural member of the aircraft.

As best shown in FIG. 14, at each end, the wing spar 128 is connected to a second carriage 156 that is in turn connected to the wing 126. In this manner the wing spar 128 is connected to the wing 126. While a separate second carriage 156 is provided at each end of the wing spar 128, for ease of description, only one second carriage will be described herein.

As best shown in FIGS. 14 and 16, the second carriage 156 includes a cap plate 158 fixed on an end of the wing spar 128 such as by bolting it to a flange that is welded or otherwise fixed to the wing spar. A slide or linear bearing 160 is disposed between the cap plate 158 and the wing 126, preferably with a support plate 162 disposed between the wing 126 and the linear bearing 160. One rail 164 of the linear bearing 160 is connected to the cap plate 158, the other rail 166 of the linear bearing 160 is connected to the support plate 162, and ball bearings 168 are retained between the rails 164, 166. A second actuator 170 is carried by the cap plate 158, and is shown as being connected to one or more brackets 172 that are in turn connected to the cap plate 158. The actuator 170 may be any suitable actuator such as set forth above for the actuator 148 (or any of the previously disclosed actuators) and preferably includes a drive member 174 that is connected to the support plate 162, and hence the wing 126, such as by an L-shaped bracket 176 that is connected to the support plate 162. In this manner, the actuator 170 can drive the wing 126 for lateral movement relative to the wing spar 128 between first and second positions.

The wing spar 128 preferably is received in the flanges 136 of the bracket 130 for pivoted movement to permit pivoted movement of the wing assembly 112 relative to the fuselage 116. Bearings (not shown) preferably are received in the openings 138 of each flange 136 through which the wing spar 128 passes. To control pivoted movement of the wing assembly 112, a third actuator 178 preferably is coupled to the wing spar 128. The actuator 178 may be of any suitable construction and arrangement to pivot the wing spar 128 and is shown in FIG. 14 as a motor 180 with a drive gear 182 that is driven by the motor 180 and coupled to a driven gear 184 that is fixed to the wing spar 128. The motor 180 may be carried by a motor bracket 186 that is fixed to the platform 134. The motor 180 may also lock or prohibit pivoted movement of the wing spar 128, if desired. In FIG. 15, the motor 180 drives a drive sprocket 188 that is coupled to a driven sprocket 190 by a chain or belt 192 to effect the pivoted movement of the wing spar 128. Of course, other actuators or drive arrangements may be employed.

In use of this aircraft 110, the center of lift may be adjusted by activating the first actuators 148 to move the first carriages 132 and thereby move the wing spar 128 relative to the fuselage 116. The wing 126 may be moved relative to the wing spar 128 along the linear bearings 160 by activating the second actuators 170. And the wing assembly 112 may pivot about the axis 154 of the wing spar 128 in response to aerodynamic forces acting on the wing assembly 112, or as controlled by the third actuator 178.

Another implementation of a wing assembly 200 is shown in FIGS. 17-19. In this wing assembly 200, each end of the wing 202 is carried by an arm 204, and the arms 204 are in turn connected to and extend outwardly from the wing spar 206. In the implementation shown, the arms 204 are generally perpendicular to the wing spar 206 although other arrangements could be utilized. A first carriage 208 includes an actuator 210 that is carried by, for example, the fuselage (not shown), and includes a drive member 212 that is driven between first and second positions by the actuator 210 and is coupled to the wing spar 206. Movement of the drive member 212 between its first and second positions pivots the wing spar 206 and arms 204, and hence, moves the wing 202 fore or aft relative to the fuselage to change the position of the center of lift of the wing 202. Accordingly, rather than horizontal shifting of the wing spar 206, the center of lift is moved by pivoting the wing spar 206.

To move the wing 202 relative to the wing spar 206, one or more second carriages 214 are provided, each including a second actuator 216 that is carried by an arm 204 and coupled to the wing 202 through a rack and pinion assembly 218. Each rack and pinion assembly 218 includes a pinion gear 222 coupled to the actuator 216 to drive the pinion gear 222 for rotation relative to the arm 204. A rack 224 is carried by the wing 202 and has a plurality of teeth 226 that are constructed and arranged to mesh with teeth (not shown) of the pinion gear 222. Rotation of the pinion gear 222 displaces the rack 224 and hence, the wing 202, relative to the arm 204 and wing spar 206 to adjust the position of the wing 202 fore or aft (i.e. toward the nose or toward the tail of the aircraft with which the wing is used).

Figure 20:
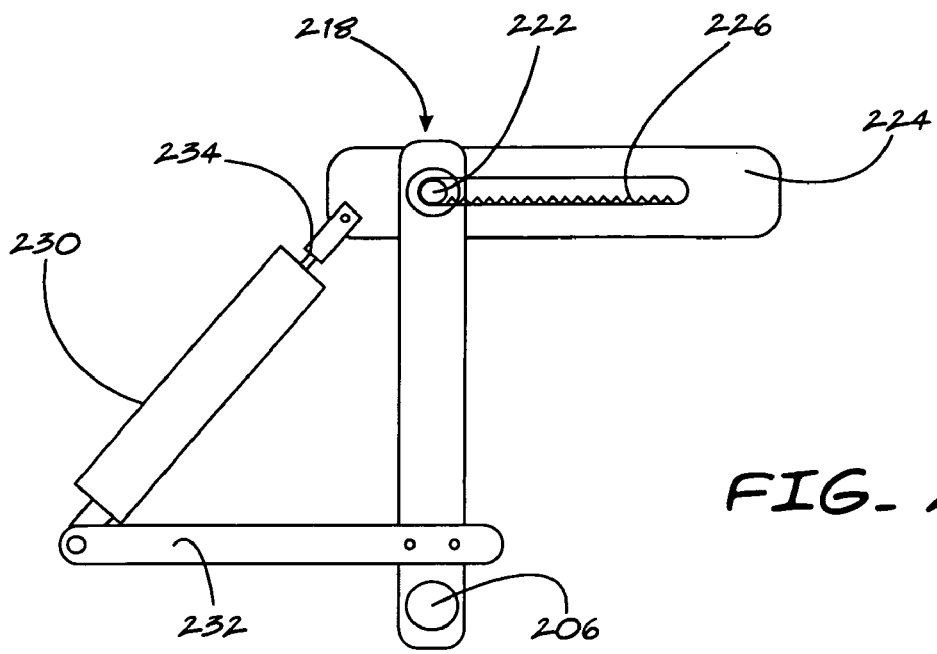
FIG. 20 is a side elevation view of a third actuator that may be used with the wing assembly of FIG. 17.
Figure 21:
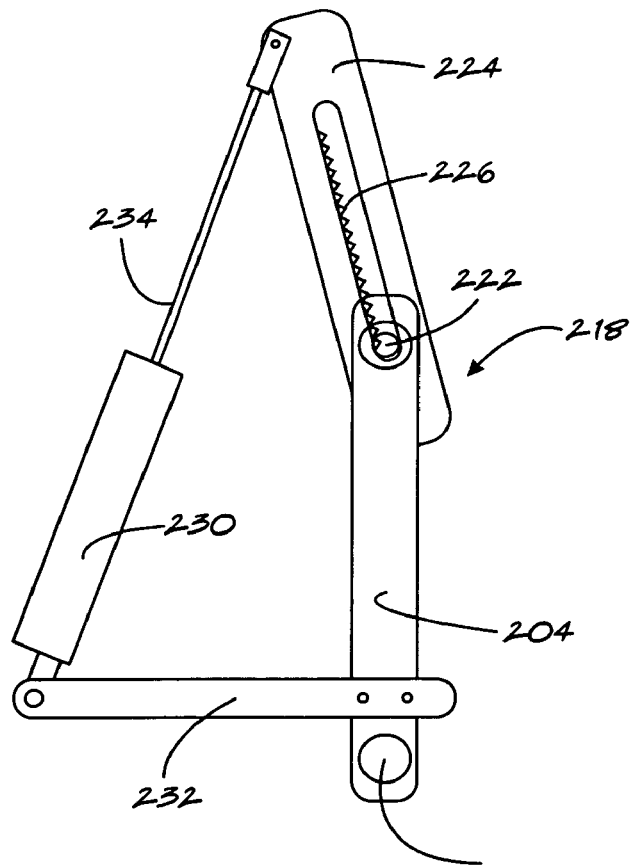
FIG. 21 is a side elevation view of the third actuator in a different position.

The wing 202 may also pivot relative to the arms 204 and wing spar 206 in response to aerodynamic forces acting on the wing 202. Additionally, as shown in FIGS. 20 and 21, a third actuator 230 may be coupled to the wing assembly 112 to control and/or lock the position of the tilt or pivot of the wing 202. The third actuator 230 is pivotally carried at one end on a bracket 232 that is connected to the arm 204. The third actuator 230 includes a drive member 234 that is coupled to the rack 224 and is driven between retracted (FIG. 20) and extended (FIG. 21) positions by the actuator 230. In its retracted position, the actuator 230 accommodates a position of the wing 202 that is fully moved aft and wherein the rack 224 is generally horizontal. In its extended position, the actuator 230 accommodates and can lock the wing 202 in a position wherein the wing is fully moved forward and wherein the rack 224 is tilted to a designed maximum angle. In the implementation shown, the designed maximum angle is about 80 degrees from horizontal, although that angle could be altered as desired. Instead of the third actuator 230, a tether or other mechanism could be used to limit the positions of the wing. The third actuator, tether or other wing control device may be used to limit the position of the wing when the aircraft is not in use or when aerodynamic forces are not sufficient to stabilize or position wing (e.g. when initially starting engine/props). The third actuator may also be responsive to dampen oscillations of the wing, if desired. The bracket 232 may be connected to the third actuator 230 between the ends of the actuator or otherwise to permit the rack 224 to pivot so that its front end is lower than its rear end. Preferably, the third actuator does not interfere with or undesirably pivot the rack as the rack is driven by the pinion gear 222 and actuator 216.

When the wing tilt bearings are locked, each wing assembly 12, 112, 200 provides inherent pitch stability for an aircraft based on a balance of aerodynamic forces about a preferably horizontal axis that joins the tips or ends of the wing. When the wing is unlocked and free to pivot, the wing 72, 126, 202 may assume increased angles of attack/incidence, and rapid changes of the angle of attack/incidence while remaining under pitch control. The pilot of the aircraft can quickly position the wing 72, 126, 202 in any number of positions between about 0 and 75 degrees of inclination relative to horizontal with pitch stability throughout. The wing assembly 12, 112, 200 exploits aerodynamic forces to tilt the wing 72, 126, 202 to a stable angle and can do so without a motor or other actuator. The wing assembly 12, 112, 200 will still function even if the shape of the wing changes or becomes distorted since the wing will still seek a position where the forces acting on it are balanced. The lift and drag of the wing can be quickly regulated without flap actuation. This permits efficient, high speed cruise; high lift positions for takeoff, abrupt maneuvering, or landing; and braking or deceleration with the wing stabilized at extreme angles of attack/incidence with quick, stable recovery from this flight mode. All of the above can be accomplished without transferring diving moments or pitch instability to the aircraft, nor allowing significant aerodynamic forces to feed back into the wing assembly control mechanism(s).

Short takeoffs are possible since the wing 72, 126, 202 can be positioned full forward to tilt the wing at a high angle to spoil the propeller thrust as the throttle is increased and thereby reduce forward motion. At higher throttle, the wing 72, 126, 202 can be shifted aft slightly to decrease the angle of incidence enough to re-attach the air flow over the wing and generate sudden, high lift. This would enable the aircraft to ascend rapidly, given sufficient thrust. Once at a desired altitude, the wing 72, 126, 202 can be shifted further aft to reduce the angle of incidence for efficient cruise, and this change of flight modes occurs without any pitching or diving moments being transferred to the body of the aircraft.

Further, movement of the center of lift of the wing assembly 12, 112, 200 maintains balance and facilitates compensating for fuel burnoff, extra passengers, or cargo weight, without trimming wing flaps or the like so that trim drag is eliminated. This increases both performance and efficiency.

The embodiments of the aircraft and wing assembly 12, 112, 200 discussed above are intended to be illustrative of some presently preferred embodiments of the invention, and are not limiting. Various modifications within the spirit and scope of the invention will be readily apparent to those skilled in the art. Some modifications or alternatives have been expressly set forth in the above detailed description, but it should be recognized that still other modifications, substitutions or alternatives will be apparent to skilled persons. The invention is defined by the following claims.

We claim:

1. An aircraft having a wing assembly mounted in a slipstream of a source of propulsion of the aircraft, comprising:
   a body having a longitudinal axis;
   a wing assembly carried by the body and including a moveable portion moveable relative to the body and a wing carried by said moveable portion;
   a first actuator coupled to said moveable portion to move said moveable portion relative to the body in a direction generally parallel to said longitudinal axis; and
   a second actuator coupled to the wing to move the wing relative to said moveable portion and between first and second positions, and wherein said second actuator at least selectively permits uninhibited pivoted movement of the wing relative to the body in response to aerodynamic forces acting on the wing so that the wing may pivot to a position wherein the forces acting on the wing are balanced.

2. The wing assembly of claim 1 further comprising a third actuator operable to at least selectively control the pivoted movement of the wing.

3. The wing assembly of claim 2 wherein said first, second and third actuators are operable independently from one another.

4. The wing assembly of claim 1 wherein the first actuator drives the moveable portion fore and aft relative to the body.

5. The wing assembly of claim 1 wherein the first actuator pivots the moveable portion relative to the body.

6. The wing assembly of claim 1 wherein the second actuator drives the wing fore and aft between first and second positions relative to the body.

7. The wing assembly of claim 6 wherein the second actuator is operable to move the wing in any pivoted orientation of the wing relative to the second actuator.

8. The wing assembly of claim 6 wherein the second actuator permits pivoted movement of the wing relative to the second actuator so that the wing can pivot to a position wherein the forces acting on the wing are balanced in any position of the wing between or in its first and second positions.

9. The wing assembly of claim 1 wherein the moveable portion includes a wing spar that carries the wing, and a carriage disposed between the wing spar and the body to permit movement of the wing spar relative to the body.

10. The wing assembly of claim 1 wherein the first actuator is coupled to the moveable portion by a first carriage that permits linear movement of the moveable portion relative to the body.

11. The wing assembly of claim 10 wherein the first carriage includes a rack with teeth and a driven gear coupled to the first actuator and having teeth engageable with the teeth of the rack to move the rack relative to the first actuator.

12. The wing assembly of claim 10 wherein the first carriage includes a linear bearing having a first rail carried by the body and a second rail carried by the moveable portion and slideably coupled to the first rail to permit sliding movement of the moveable portion relative to the body.

13. The wing assembly of claim 1 wherein the second actuator is coupled to the wing by a second carriage.

14. The wing assembly of claim 13 wherein the second carriage includes a rack with teeth and a driven gear coupled to the second actuator and having teeth engageable with the teeth of the rack to move the rack relative to the second actuator.

15. The wing assembly of claim 13 wherein the second carriage includes a linear bearing having a first rail carried by the wing and a second rail carried by the moveable portion and slideably coupled to the first rail to permit sliding movement of the wing relative to the moveable portion.

16. The wing assembly of claim 14 which also includes a third actuator coupled to the rack to control pivoted movement of the wing.

17. The wing assembly of claim 1 wherein the first actuator is coupled to the moveable portion by a first carriage carried by said body to permit movement of the moveable portion relative to said body in a generally parallel direction to said longitudinal axis, and the second actuator is coupled to the wing by a second carriage attached to the wing and carried by the first carriage for conjoint movement therewith in response to movement of the first carriage, the second carriage being arranged for translation relative to the first carriage to allow the wing to move between fore and aft positions relative to the first carriage, and the second carriage is carried for pivoted movement relative to the first carriage to allow the wing to pivot relative to the first carriage.

18. A wing assembly for an aircraft, comprising:
a wing having opposite wing tips;
a first carriage attached to each of the wing tips; and
a pair of second carriages arranged to carry the first carriages for conjoint linear movement of the wing with the second carriages in response to linear movement of the second carriages, the first carriages being arranged for translation relative to the second carriages to allow the wing to move between fore and aft positions relative to the second carriages, the first carriages being arranged for pivotal movement relative to the second carriages to allow the wing portion to pivot relative to the second carriages.

19. A wing assembly for an aircraft, comprising:
a wing assembly including a wing spar and a wing carried by the wing spar for movement with and relative to the wing spar;
a first actuator coupled to the wing spar to pivot the wing spar relative to the aircraft;
a second actuator coupled to the wing to move the wing relative to the wing spar while permitting the wing to pivot relative to the second actuator and the wing spar.

20. The wing assembly of claim 19 wherein the second actuator includes a motor, a gear driven by the motor, and a rack driven by the gear and connected to the wing so that the wing moves with the rack and relative to the second actuator.

21. The wing assembly of claim 19 which also includes a pivot control feature that is coupled to the wing to at least selectively control the pivoted movement of the wing relative to the wing spar.

22. The wing assembly of claim 21 wherein the pivot control feature includes a third actuator that is connected to the rack to selectively pivot the wing.

23. The wing assembly of claim 21 wherein the pivot control feature is operable to limit or prevent pivoted movement of the wing relative to the wing spar.

* * * * *